Patented May 2, 1950

2,505,772

UNITED STATES PATENT OFFICE 2,505,772

ALKYL ETHERS OF 3-HYDROXY-PHENOTHIAZINE

David F. Houston, El Cerrito, Calif., assignor to the United States of America as represented by the Secretary of Agriculture No Drawing. Application August 23, 1949, Serial No. 111,964

8 Claims. (Cl. 260—243)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to phenothiazine derivatives, particularly to alkyl ethers of 3-hydroxyphenothiazine wherein the alkyl radicals contain at least 8 carbon atoms. These compounds correspond to the formula:

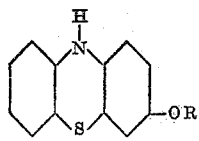

wherein R is an alkyl radical containing at least 8 carbon atoms.

These compounds are useful as dyestuff intermediates, particularly for the preparation of oil-soluble dyestuffs by reacting them with an alkali metal sulphide, for example, sodium polysulphide. They are also useful as intermediates for the preparation of therapeutic compounds.

The alkyl ethers are prepared by fusing a p-alkoxydiphenylamine with sulphur in the presence of iodine as a catalyst. The reaction may be illustrated by the following equation, wherein R represents an alkyl radical containing at least 8 carbon atoms:

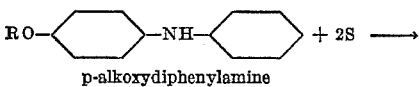
p-alkoxydiphenylamine

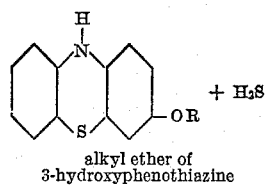
alkyl ether of
3-hydroxyphenothiazine

In accordance with this invention, therefore, the p-alkoxydiphenylamine is fused with sulphur in the presence of iodine as a catalyst. The amine and the sulphur are preferably employed in the ratio shown in the equations, namely, 2 atoms of sulphur to each mole of amine. The proportion of iodine is not critical and generally it is employed in a proportion of about 0.5% to about 3.0%, based on the weight of the sulphur and amine reactants. The temperature of the fusion should be from about 150° C. to about 200° C., preferably about 165–175° C. The time of reaction depends on the temperature used. In general, the reaction is continued until the evolution of $H_2S$ ceases and preferably heating is continued thereafter for a short time, say, 5 to 30 minutes.

The amine reactant may be any compound which corresponds to the formula:

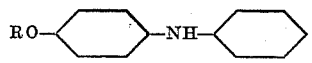

wherein R is an alkyl group containing at least 8 carbon atoms. Thus the amines may be used wherein R is octyl, nonyl, decyl, undecyl, dodecyl, tridecyl, tetradecyl, pentadecyl, hexadecyl, heptadecyl, octadecyl, and so forth. The alkyl radical need not be a straight-chain (normal) radical but may be branched so that R may also be 2-methyl-heptyl, 2-ethyl hexyl, and so forth. It is obvious that preparation of a desired alkyl ether involves selection of the desired alkoxydiphenyl amine reactant.

After completion of the sulphur fusion, the products may be isolated in several ways. The method of isolation preferred involves extraction of the fusion mass with an inert, organic, hydrophobic solvent such as hexane, benzene, toluene, xylenes, etc. The resulting extract is then concentrated and cooled to crystallize the alkyl ether. If desired, the products may be recrystallized from the same solvents.

The following examples illustrate the invention in greater detail.

EXAMPLE I

*Preparation of 3-n-octyloxyphenothiazine*

5.95 grams (0.02 mol) of p-n-octyloxydiphenylamine was ground with 1.3 grams (0.04 atom) of sulphur and the mixture placed into a vessel together with 0.1 gram of iodine. The mixture was then heated at 160–170° C. It was noted that after heating for 45 minutes the evolution of $H_2S$ had ceased and heating was discontinued. The fusion mass was allowed to cool then extracted with hexane until the extract was nearly colorless. The hexane extract was then concentrated by evaporation and allowed to cool whereupon the 3-n-octyloxyphenothiazine crystallized out of solution. The product had a melting point of 110.1 to 111.5° C. and was obtained in a yield of 80%. Analysis: C, 73.1%; H, 7.52%; N, 4.31% (calculated: C, 73.35%; H, 7.70%; N, 4.28%).

EXAMPLE II

*Preparation of n-dodecyl, and n-hexadecyl ethers of 3-hydroxyphenothiazine*

The process of Example I was repeated, substituting for the p-n-octyloxydiphenylamine, stoichiometrically equivalent amounts of p-n-dodecyloxydiphenylamine, and p-n-hexadecyloxydiphenylamine, respectively. The products were obtained in yields of 80 to 84% as nearly white powders. The following results were also obtained:

| Alkyl group | Melting point, °C. | Analytical data, per cent | | | | | |
|---|---|---|---|---|---|---|---|
| | | Carbon | | Hydrogen | | Nitrogen | |
| | | Found | Calc'd. | Found | Calc'd. | Found | Calc'd. |
| n-dodecyl | 101–103 | 75.1 | 75.15 | 8.61 | 8.67 | 3.65 | 3.65 |
| n-hexadecyl | 101.5–103 | 76.4 | 76.48 | 9.30 | 9.40 | 3.21 | 3.19 |

Having thus described the invention, what is claimed is:

1. A method for preparing an alkyl ether of 3-hydroxyphenothiazine which comprises fusing a mixture of sulphur, iodine, and a p-alkyloxydiphenylamine wherein the alkyl radical contains at least 8 carbon atoms.
2. Process in accordance with claim 1 wherein the amine reactant is p-octyloxydiphenylamine.
3. Process in accordance with claim 1 wherein the amine reactant is p-dodecyloxydiphenylamine.
4. Process in accordance with claim 1 wherein the amine reactant is p-hexadecyloxydiphenylamine.
5. 3-octyloxyphenothiazine.
6. 3-dodecyloxyphenothiazine.
7. 3-hexadecyloxyphenothiazine.
8. A 3-alkyloxyphenothiazine wherein the alkyl radical contains at least 8 carbon atoms.

DAVID F. HOUSTON.

REFERENCES CITED

The following references are of record in the file of this patent:

UNITED STATES PATENTS

| Number | Name | Date |
|---|---|---|
| 2,024,477 | Scott | Dec. 17, 1935 |
| 2,123,928 | Bosquet | July 19, 1938 |

FOREIGN PATENTS

| Number | Country | Date |
|---|---|---|
| 209,501 | Switzerland | July 16, 1940 |
| 209,502 | Switzerland | July 16, 1940 |

OTHER REFERENCES

Pummerer et al.: Chem. Abstracts, vol. 7 (1913), pp. 3337 and 3338.